US011479204B1

United States Patent
Moran et al.

(10) Patent No.: US 11,479,204 B1
(45) Date of Patent: Oct. 25, 2022

(54) AIRBAG WITH REINFORCED TETHER

(71) Applicant: ZF Passive Safety Systems US Inc., Washington, MI (US)

(72) Inventors: Dylan Moran, Rochester Hills, MI (US); Manuel Schaefer, Berlin, MI (US); Ali Emambakhsh, Rochester, MI (US); Michael Lalka, II, Macomb, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/365,573

(22) Filed: Jul. 1, 2021

(51) Int. Cl.
*B60R 21/2338* (2011.01)
*B60R 21/205* (2011.01)
*B60R 21/216* (2011.01)
*B60R 21/00* (2006.01)

(52) U.S. Cl.
CPC ........ *B60R 21/2338* (2013.01); *B60R 21/205* (2013.01); *B60R 21/216* (2013.01); *B60R 2021/0004* (2013.01); *B60R 2021/2161* (2013.01); *B60R 2021/23382* (2013.01)

(58) Field of Classification Search
CPC . B60R 21/2338; B60R 21/205; B60R 21/216; B60R 2021/0004; B60R 2021/2161; B60R 2021/23382
See application file for complete search history.

(56) References Cited

U.S. PATENT DOCUMENTS

| 2002/0175511 A1* | 11/2002 | Dunkle | B60R 21/2338 |
| | | | 280/743.2 |
| 2005/0057029 A1* | 3/2005 | Thomas | B60R 21/233 |
| | | | 280/739 |
| 2012/0007345 A1* | 1/2012 | Lee | B60R 21/231 |
| | | | 280/728.2 |

FOREIGN PATENT DOCUMENTS

| DE | 4334606 C2 * | 6/1999 | ........... B60R 21/233 |
| GB | 2432344 A * | 5/2007 | ........... B60R 21/233 |
| JP | 2007261411 A * | 10/2007 | ........... B60R 21/203 |
| JP | 2008254500 A * | 10/2008 | ........... B60R 21/231 |
| KR | 20090117393 A * | 11/2009 | ............ B60R 21/16 |
| WO | WO-2013146493 A1 * | 10/2013 | ........... B60R 21/203 |

* cited by examiner

*Primary Examiner* — Drew J Brown
(74) *Attorney, Agent, or Firm* — Tarolli, Sundheim, Covell & Tummino LLP

(57) ABSTRACT

An apparatus for helping to protect an occupant of a seat in a vehicle having an instrument panel and a housing positioned therein includes an airbag for positioning in the housing and defining an inflatable volume for receiving inflation fluid from an inflator. The airbag includes an occupant-facing panel. A tether has a first end connected to the occupant-facing panel for forming a pocket therein and a second end connected to a portion of the airbag positioned within the housing. The second end includes a folded-over portion. First stitching extends through the folded-over portion in a direction extending transverse to a centerline of the tether. Second stitching extends through the folded-over portion and parallel to the first stitching. The first and second stitchings are spaced a predetermined length from one another.

14 Claims, 11 Drawing Sheets

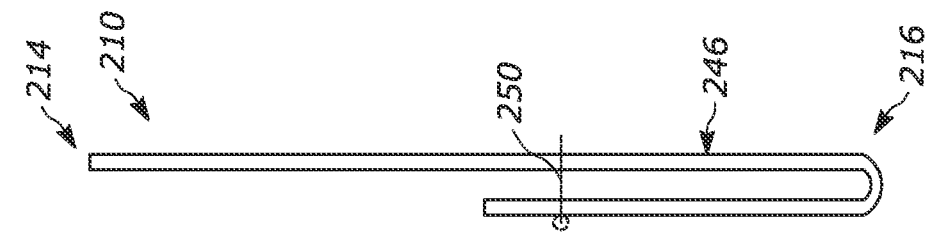
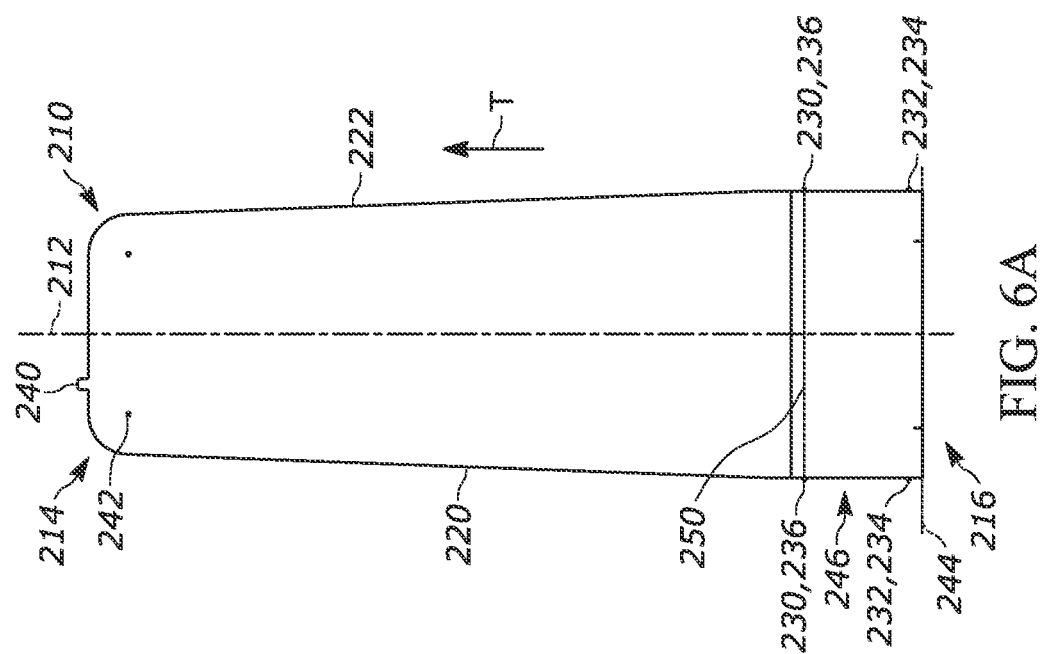
FIG. 6B
FIG. 6A

AIRBAG WITH REINFORCED TETHER

TECHNICAL FIELD

The present invention relates generally to vehicle airbags and, in particular, relates to an airbag having a reinforced face tether.

BACKGROUND

It is known to inflate an airbag to help protect a vehicle occupant in the event of a frontal impact to a vehicle. The airbag is commonly stored in a deflated condition, together with an inflator, in a vehicle instrument panel. In the event of a frontal impact to the vehicle of a magnitude above a predetermined threshold, the inflator is actuated and the airbag is inflated into a position between the vehicle occupant and the instrument panel. The airbag can help protect the vehicle occupant from forcefully striking or being struck by parts of the vehicle such as the instrument panel.

SUMMARY

In one example, an apparatus for helping to protect an occupant of a seat in a vehicle having an instrument panel and a housing positioned therein includes an airbag for positioning in the housing and defining an inflatable volume for receiving inflation fluid from an inflator. The airbag includes an occupant-facing panel. A tether has a first end connected to the occupant-facing panel for forming a pocket therein and a second end connected to a portion of the airbag positioned within the housing. The second end includes a folded-over portion. First stitching extends through the folded-over portion in a direction extending transverse to a centerline of the tether. Second stitching extends through the folded-over portion and parallel to the first stitching. The first and second stitchings are spaced a predetermined length from one another.

In another example, an apparatus for helping to protect an occupant of a seat in a vehicle having an instrument panel and a housing positioned therein includes an airbag for positioning in the housing and defining an inflatable volume for receiving inflation fluid from an inflator. The airbag includes an occupant-facing panel. A tether extends along a centerline from a first end connected to the occupant-facing panel for forming a pocket therein to a second end connected to a portion of the airbag positioned within the housing. The second end includes a folded-over portion. The tether has a width that increases continuously from the first end to the second end. First stitching extends through the folded-over portion in a direction extending perpendicular to the centerline. Second stitching extends through the folded-over portion and parallel to the first stitching. The first and second stitchings are spaced a predetermined length from one another.

In another aspect, taken alone or in combination with any other aspect, the first stitching extends perpendicular to the centerline.

In another aspect, taken alone or in combination with any other aspect, the predetermined length is configured such that the tether engages at least one of the housing and the instrument panel between the first and second stitchings.

In another aspect, taken alone or in combination with any other aspect, stitching extends through the first, second, and third panels.

In another aspect, taken alone or in combination with any other aspect, the tether has a width that increases in a direction extending from the first end to the second end.

In another aspect, taken alone or in combination with any other aspect, the width increases continuously from the first end to the second end.

In another aspect, taken alone or in combination with any other aspect, the second stitching is positioned closer to an axial extent of the folded-over portion at the second end.

In another aspect, taken alone or in combination with any other aspect, the second stitching includes backtacked first and second ends.

In another aspect, taken alone or in combination with any other aspect, the tether is tensioned during airbag deployment in a direction extending along the centerline such that the first and second stitchings extend perpendicular to the tether tension direction.

In another aspect, taken alone or in combination with any other aspect, the tether is folded over a second centerline extending perpendicular to the centerline to form the folded over portion.

Other objects and advantages and a fuller understanding of the invention will be had from the following detailed description and the accompanying drawings.

BRIEF DESCRIPTION OF THE DRAWINGS

FIG. 6A is a top view of the panel of FIG. 5 folded-over.

FIG. 6B is a side view of the folded-over panel of FIG. 6A.

DETAILED DESCRIPTION

Figure 1:
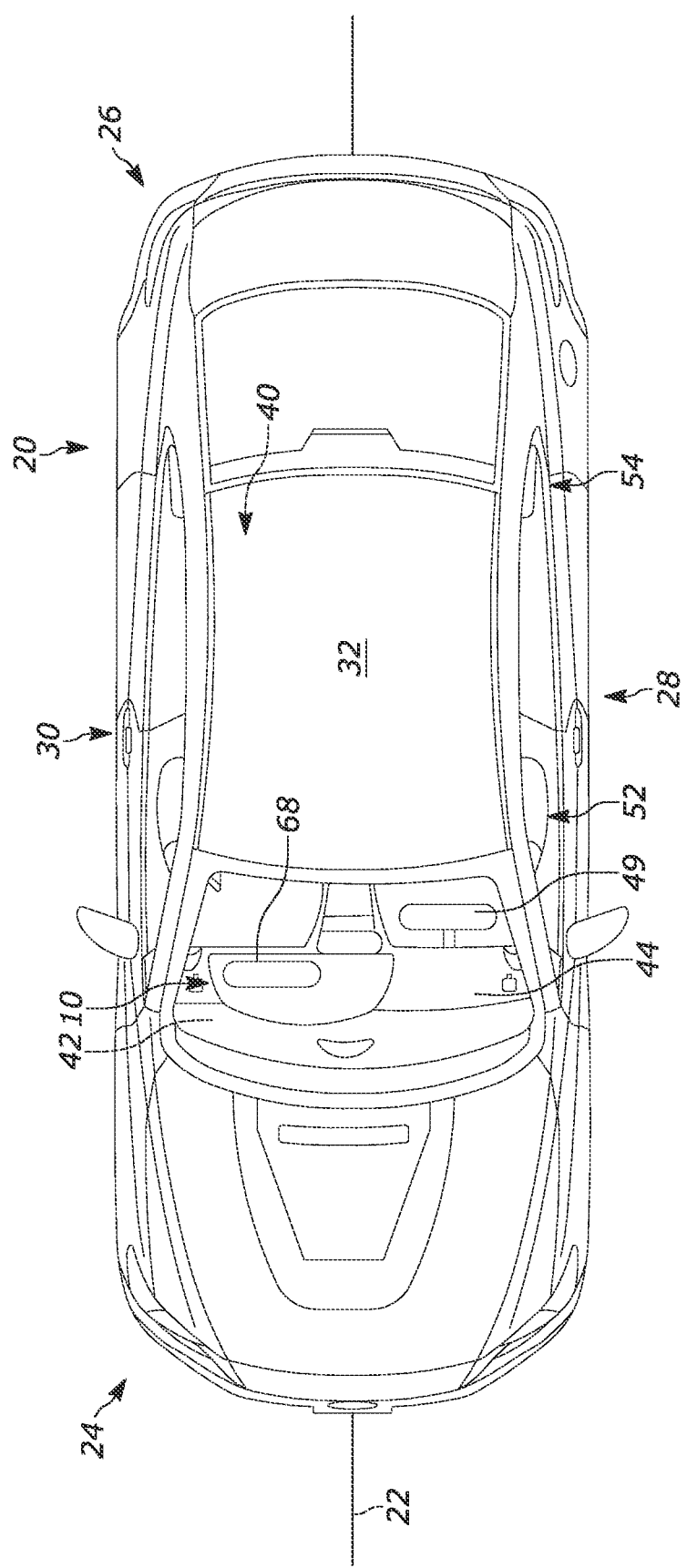
FIG. 1 is a top view of a vehicle including an example occupant restraint system.

The present invention relates generally to vehicle airbags and, in particular, relates to an airbag having a reinforced face tether. FIGS. 1-2B illustrate an example vehicle safety system in the form of an occupant restraint system 10 for a vehicle 20. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 is located between the instrument panel 42 and the roof 32. A steering wheel 49 is connected to the instrument panel 42 on the left side 28 of the vehicle 20.

Seats 50 are positioned in the cabin 40 and can be arranged in front and rear rows 52 and 54, respectively, arranged in a forward-facing manner similar to that of conventional automobiles. It will be appreciated that the vehicle 20 could alternatively include more or fewer rows of seats 50 (not shown). In any case, a seatbelt 56 is associated with each seat 50 for restraining an occupant 60 in that seat.

Each seat 50 includes a base or bottom 53 for receiving the legs 66 of the occupant 60. A seat back 55 extends from the base 53 towards the roof 32 and receives the upper torso 64 of the occupant 60. A headrest 57 is connected to the seat back 55 and receives the head 62 of the occupant 60.

The occupant restraint system 10 includes at least one vehicle occupant protection device in the form of an inflatable airbag 70 housed/concealed in the instrument panel 42. Mounting the airbag 70 in the instrument panel 42 is convenient because the airbag can be positioned in a location with a desired proximity to the occupant 60 it is intended to help protect. This can help reduce the necessary inflatable volume of the airbag 70 and can also help provide a desired airbag deployment time without requiring an excessively high-volume inflator.

The airbag 70 is stored in a module 68 having a housing 69 made of a durable material, such as plastic or metal. In the example configuration shown, the airbag modules 68 are mounted in the instrument panel 42 forward of the passenger side 30 occupant 60. The airbag 70 inflates and deploys upwards in the cabin 40 and rearward of the instrument panel 42, i.e., towards the rear end 26 of the vehicle 12. Accordingly, the airbag 70 is a passenger side airbag.

The airbag 70 is at least one of rolled and folded before being placed in the housing 69 of the module 68. The module 68 is then placed within the instrument panel 42 on the passenger side 30 and covered with a door. Alternatively or additionally, the module 68 can be placed within the steering wheel 49 (not shown) or within the instrument panel 42 on the side 28 when the vehicle 20 is autonomous (not shown).

In any case, an inflator 74 is positioned in each module 68 for providing inflation fluid to each airbag 70. The inflator 74 is operatively connected (e.g., by wires) to an airbag controller 80 (see FIG. 2) that includes or communicates with one or more crash sensors (not shown). The airbag controller 80 is operative to determine the occurrence of a crash event and to actuate the inflator(s) 74 in a known manner to inflate the airbag(s) 70. The inflator 74 can be of any known type, such as stored gas, solid propellant, augmented or hybrid.

The airbag 70 can be constructed of any suitable material, such as nylon (e.g., woven nylon 6-6 yarns), and may be constructed in any suitable manner. For example, the airbag 70 may include one or more pieces or panels of material. If more than one piece or panel is used, the pieces or panels can be interconnected by known means, such as stitching, ultrasonic welding, heat bonding, or adhesives, to form the airbag 70. The airbag 70 can be uncoated, coated with a material, such as a gas impermeable urethane, or laminated with a material, such as a gas impermeable film. The airbag 70 can therefore have a gas-tight or substantially gas-tight construction. Those skilled in the art will appreciate that alternative materials, such as polyester yarn, and alternatives coatings, such as silicone, may also be used to construct the airbag 70.

Figure 2A:
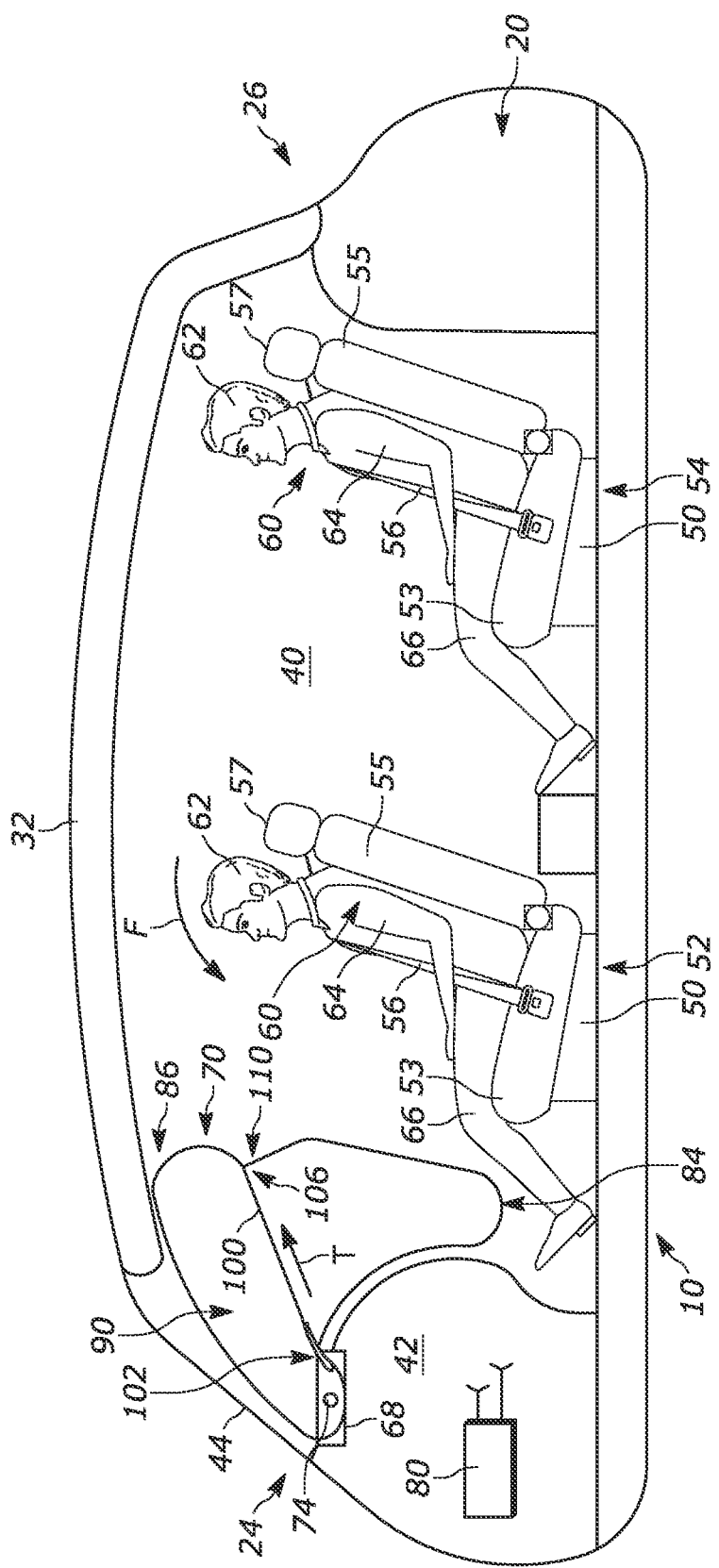
FIG. 2A is a schematic illustration of a cabin of the vehicle with an example seating arrangement and an example airbag of the restraint system in a deployed condition.
Figure 2B:
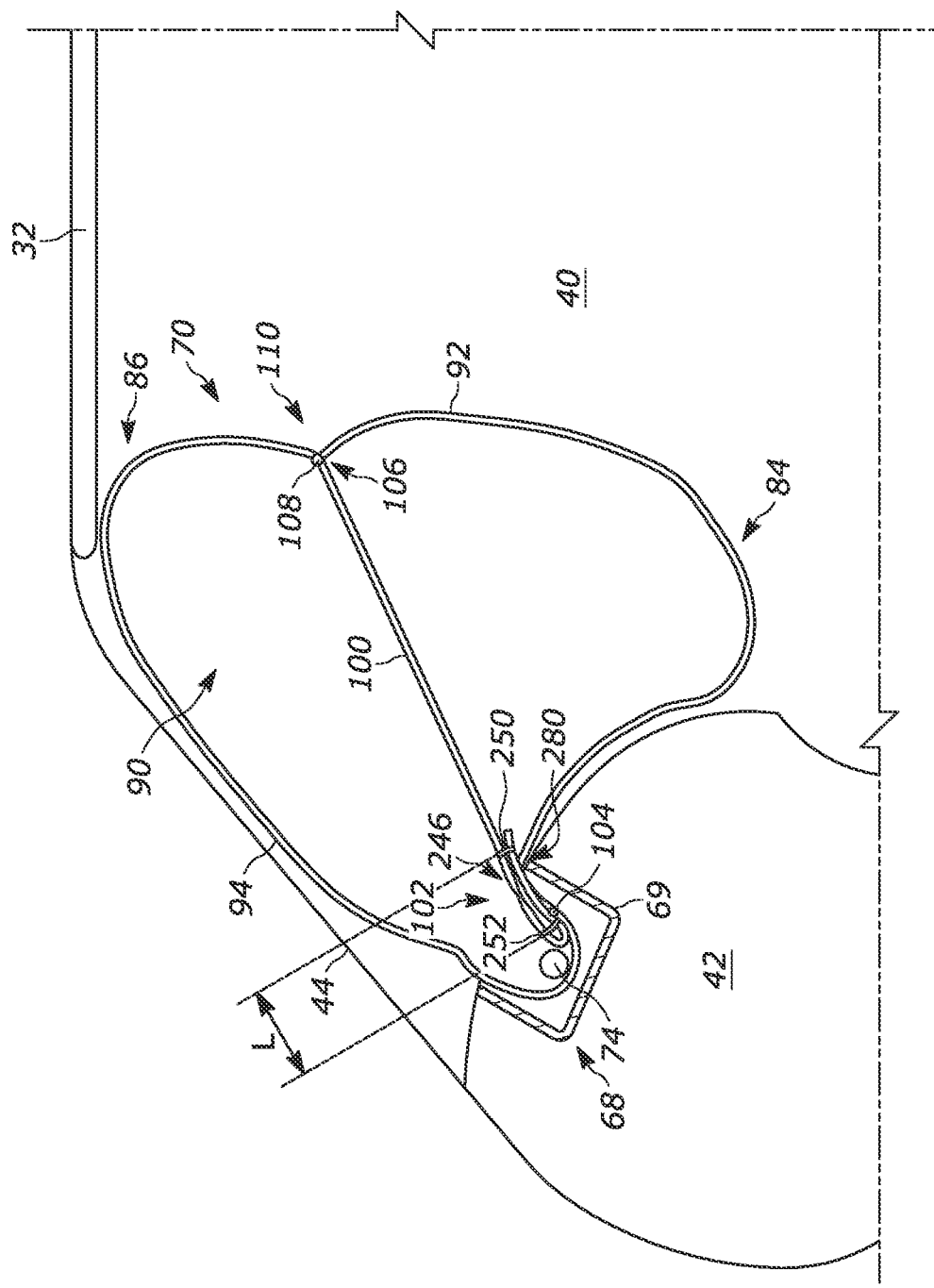
FIG. 2B is an enlarged view of a portion of FIG. 2A.
Figure 3:
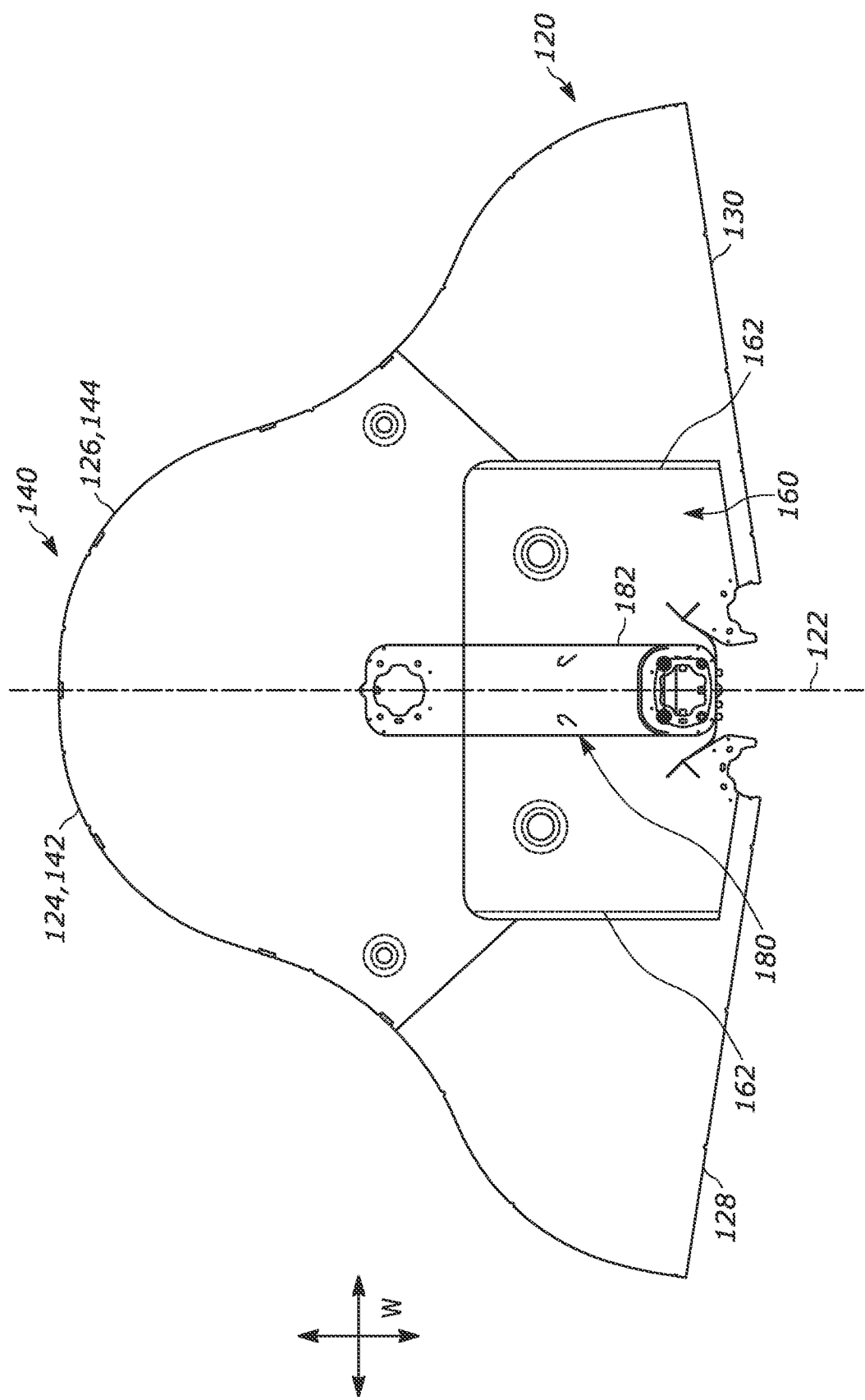
FIG. 3 is a top view of assembled panels of the airbag.

As shown in FIGS. 2A-2B, upon sensing the occurrence of an event for which inflation of the airbag 70 is desired, such as a vehicle collision, the controller 80 provides signals to the inflator 74. Upon receiving the signals from the controller 80, the inflator 74 is actuated and provides inflation fluid to the inflatable volume of the airbag 70 in a known manner. The inflating airbag 70 exerts a force on the housing 69, which causes both the housing and instrument panel 42 to open (e.g., via tear seam or door). This releases the airbag 70 to inflate and deploy from its stored condition behind the instrument panel 42 to a deployed condition extending into the cabin 40 forward of and aligned with the passenger side 30 seat 50 in the front row 52. The airbag 70, while inflated, helps protect the vehicle occupant 60 in the front row 52 by absorbing the impact of the occupant.

The airbag 70, when deployed, extends from a lower end 84 to an upper end 86 and defines an inflatable volume 90. A first or front panel 92 faces rearward towards the occupant 60. A second or rear panel 94 faces forward towards the windshield 44. The airbag 70 can include one or more vents (not shown) for venting inflation fluid from the inflatable volume 90 in a known manner in response to occupant penetration.

In its deployed condition, the lower end 84 is configured to cover at least a portion of the occupant's knees and the upper portion of the legs 66. The upper end 86 is configured to extend vertically to a position sufficient to receive and help protect the occupant's head 62 and upper torso 64. The extent of the airbag 70 deployment vertically and/or horizontally (as shown in FIGS. 2A-2B) can be adjusted in order to adjust the coverage of the airbags. To this end, the airbag 70 can be configured to extend further fore and/or aft in order to help protect the occupant 60 in the event of a side, oblique or offset collision. The inflated width of the airbag 70 in the inboard-outboard direction can also be adjusted.

A tether 100 is secured to the interior of the airbag 70 for forming a depression or pocket 110 in the occupant-facing panel 92 configured to receive the occupant 60 during a vehicle crash. The pocket 110 can provide a volume of reduced tension in the airbag 70 fabric along the occupant-facing panel 92, which provides a relatively softer impact/reduced impact forces between the occupant and the occupant-facing panel 92. To this end, the tether 100 extends from a first end 102 connected to the airbag 70 at a first location indicated at 104 within the housing 69 to a second end 106 connected to the airbag 70 at a second location indicated at 108. In one example, the second location 108 is positioned on the interior side of the occupant-facing panel 92.

Because the occupant 60 is belted, a frontal crash resulting in forward occupant 60 movement causes the occupant to move in a path toward the airbag 70, as indicated generally by the arrow F in FIG. 2A. That said, the connection between the lower end 84 and the instrument panel 42, in combination with the engagement between the deployed airbag 70 and instrument panel/windshield 44, act to limit or restrict forward movement of the airbag away from the occupant 60 in response to occupant penetration. In other words, the instrument panel 42 and windshield 44 can help prevent or limit airbag 70 movement in the direction F.

The inflation rate, deployment trajectory, and shape of the airbag 70 can be configured to optimize the protection of occupants 60 having a wide range of sizes and/or seating positions. To this end, the airbag 70 can optionally be used in combination with additional tethers and/or have multiple chambers to achieve appropriate or desired deployment characteristics suitable for the vehicle interior and/or seating position of the occupants 60. These features can be configured to help protect occupants 60 that are slouched, reclined, etc.

With this in mind, FIGS. 3-8C illustrate example components and manufacturing steps for assembling the airbag 70. To this end, the airbag 70 includes a series of panels 120, 140, 160, 180, 190 interconnected to define the ends 84, 86, the inflatable volume 90 for receiving inflation fluid from the inflator 74, and the tether 100. A weave direction of each panel 120, 140, 160, 180, 190 is indicated at W.

The first panel 120 is symmetric about a centerline 122 and includes peripheral edge portions 124, 126, 128, 130 that cooperate to define the entire perimeter of the first panel. The second panel 140 is overlaid on the first panel 120 so as to be symmetric about the centerline 122. The second panel 140 includes peripheral edge portions 142, 144 mirroring the contour of the peripheral edge portions 124, 126. Stitching extends through and interconnects the peripheral edge portions 142, 144 of the second panel 140 with the peripheral edge portions 124, 126 of the first panel 120.

A pair of the third panels 160 is overlaid on the second panel 140 so as to be symmetric about the centerline 122. Stitching interconnects peripheral edge portions 162 of the third panels 160 to the panels 120, 140. A pair of the fourth panels 180 is overlaid on the third panels 160 so as to be symmetric about and extend longitudinally along the centerline 122. Stitching interconnects peripheral edge portions 182 of the fourth panels 180 to the panels 120, 140, 160.

Figure 4:
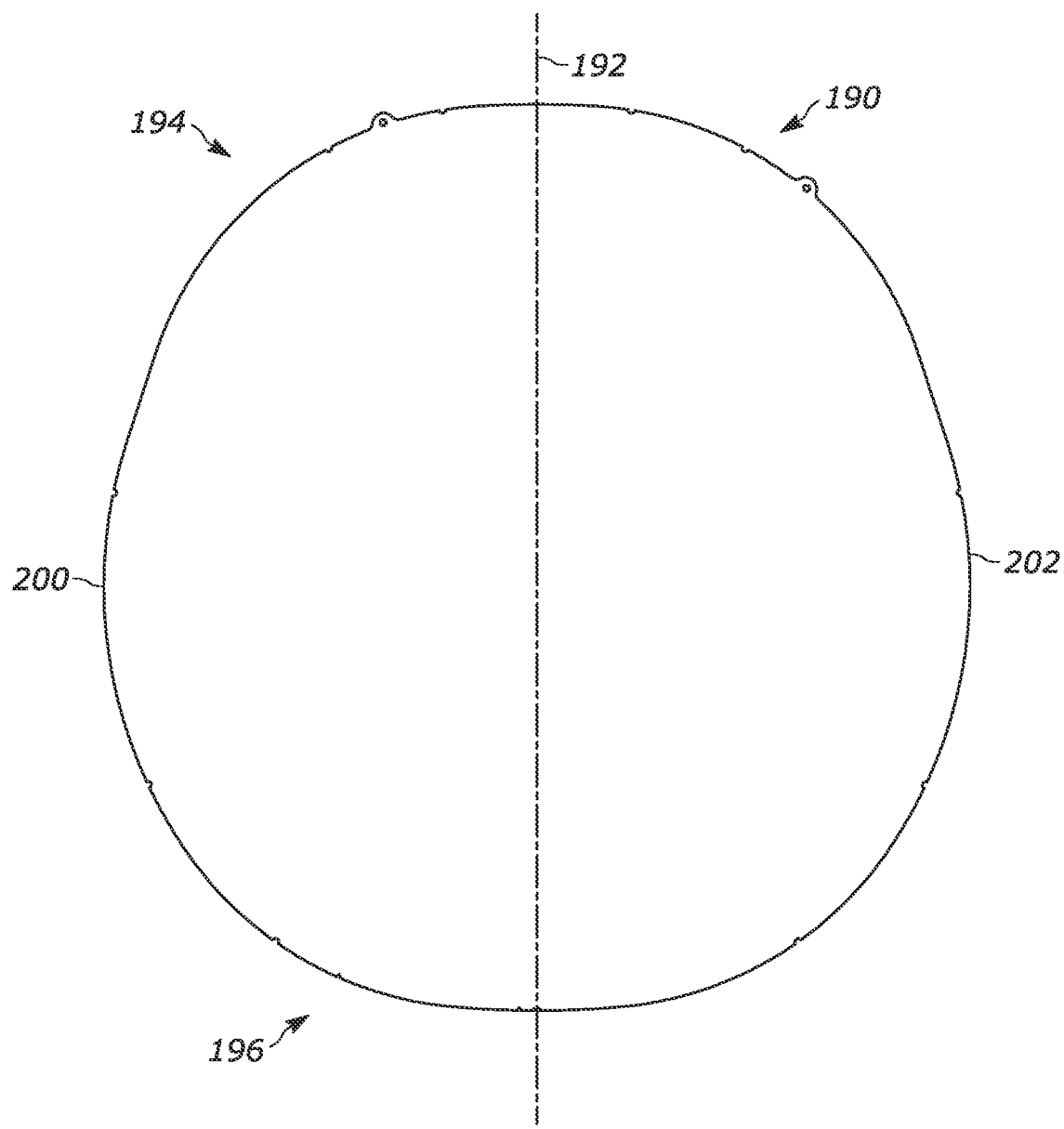
FIG. 4 is a top view of another panel of the airbag.

FIG. 4 illustrates the fifth panel 190. The fifth panel 190 is symmetric about a centerline 192 and extends from a first end 194 to a second end 196. The fifth panel 190 includes peripheral edge portions 200, 202 that collectively form the entire perimeter of the fifth panel.

Figure 5:
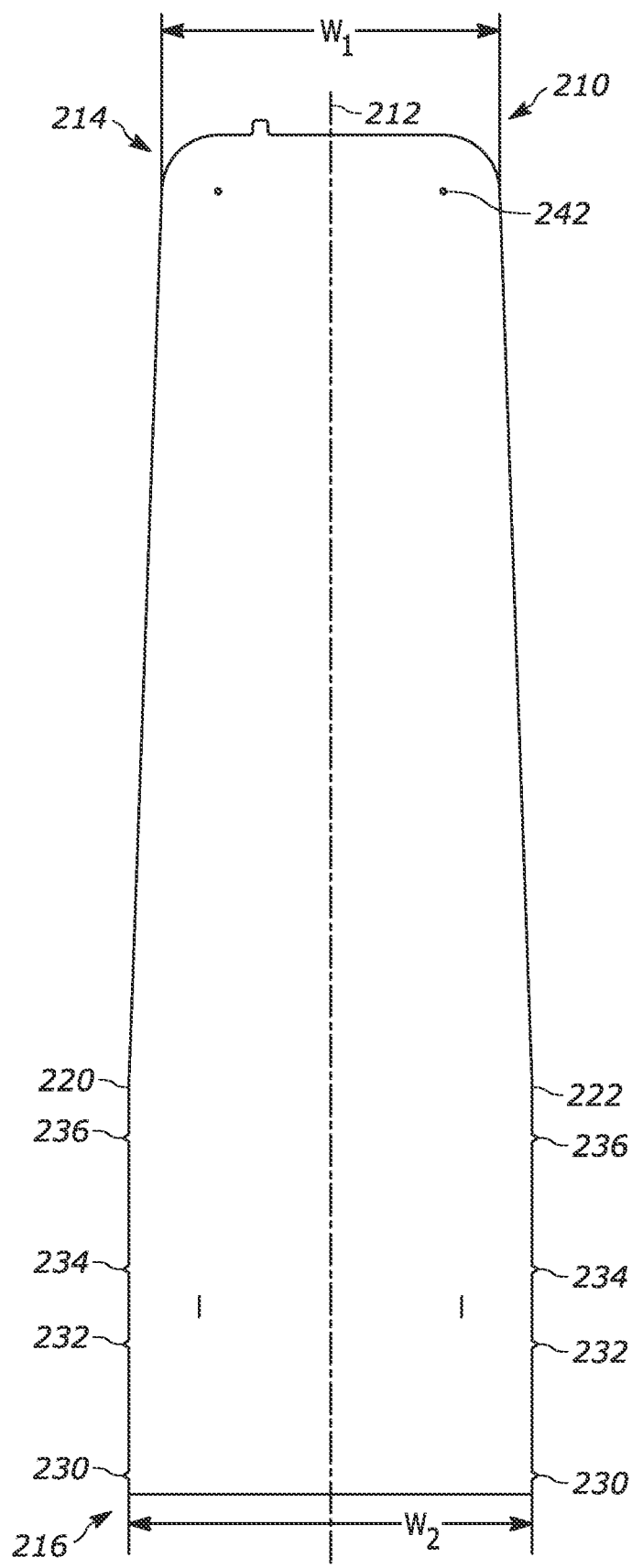
FIG. 5 is a top view of yet another panel of the airbag forming a tether.

A panel 210 for forming the tether 100 is illustrated in FIG. 5. The panel 210 extends longitudinally along a centerline 212 from a first end 214 to a second end 216. The panel 210 includes peripheral edge portions 220, 222 that cooperate to define the entire perimeter of the panel. The peripheral edge portions 220, 222 diverge from one another in a direction extending towards the second end 216. Consequently, the first end 214 has a first width $W_1$ and the second end 216 has a second width $W_2$ greater than the first width. In other words, the panel 210 is tapered. The taper can be continuous along the entire length of the panel 210 (as shown) or only extend along portion(s) of the length (not shown). Alternatively, the peripheral edge portions 220, 222 can extend parallel to one another such that the width of the panel 210 is substantially constant (not shown).

A series of alignment features, e.g., tabs, are provided at the second end 216. In the example shown, associated pairs of first tabs 230, second tabs 232, third tabs 234, and fourth tabs 236 are provided along the respective peripheral edge portions 220, 222 so as to be symmetrically arranged about the centerline 222. In other words, each of the first tabs 230 has the same longitudinal position along the respective peripheral edge portion 220, 222 relative to the centerline 212. The same is true of the second tabs 232, third tabs 234, and fourth tabs 236, respectively. Additional alignment features, such as openings 242, are provided on opposite sides of the centerline 212 at the first end 214.

Referring to FIGS. 6A-6B, the second end 216 of the panel 210 is folded-over a centerline 244 extending perpendicular to the centerline 212 towards the first end 214 such that the first and fourth tabs 230, 236 overlay one another and the second and third tabs 232, 234 overlay one another. Consequently, the panel 210 in this condition includes a two-layer, folded-over portion 246 of the panel 210.

Stitching 250 extends through the folded-over portion 246 in a direction extending transverse to the centerline 212, e.g., parallel to the centerline 244. The stitching 250 is positioned adjacent the longitudinal extent of the folded-over portion 246 in the direction of the first end 214. It will be appreciated that the stitching 250 can extend substantially between and be aligned with the overlaid tabs 230, 236. In other words, the stitching 250 can span the entire width between the longitudinal edge portions 220, 222. Alternatively, one or both ends of the stitching 250 can be spaced a predetermined distance from the respective longitudinal edge portion 220, 222 (not shown).

Figure 7:
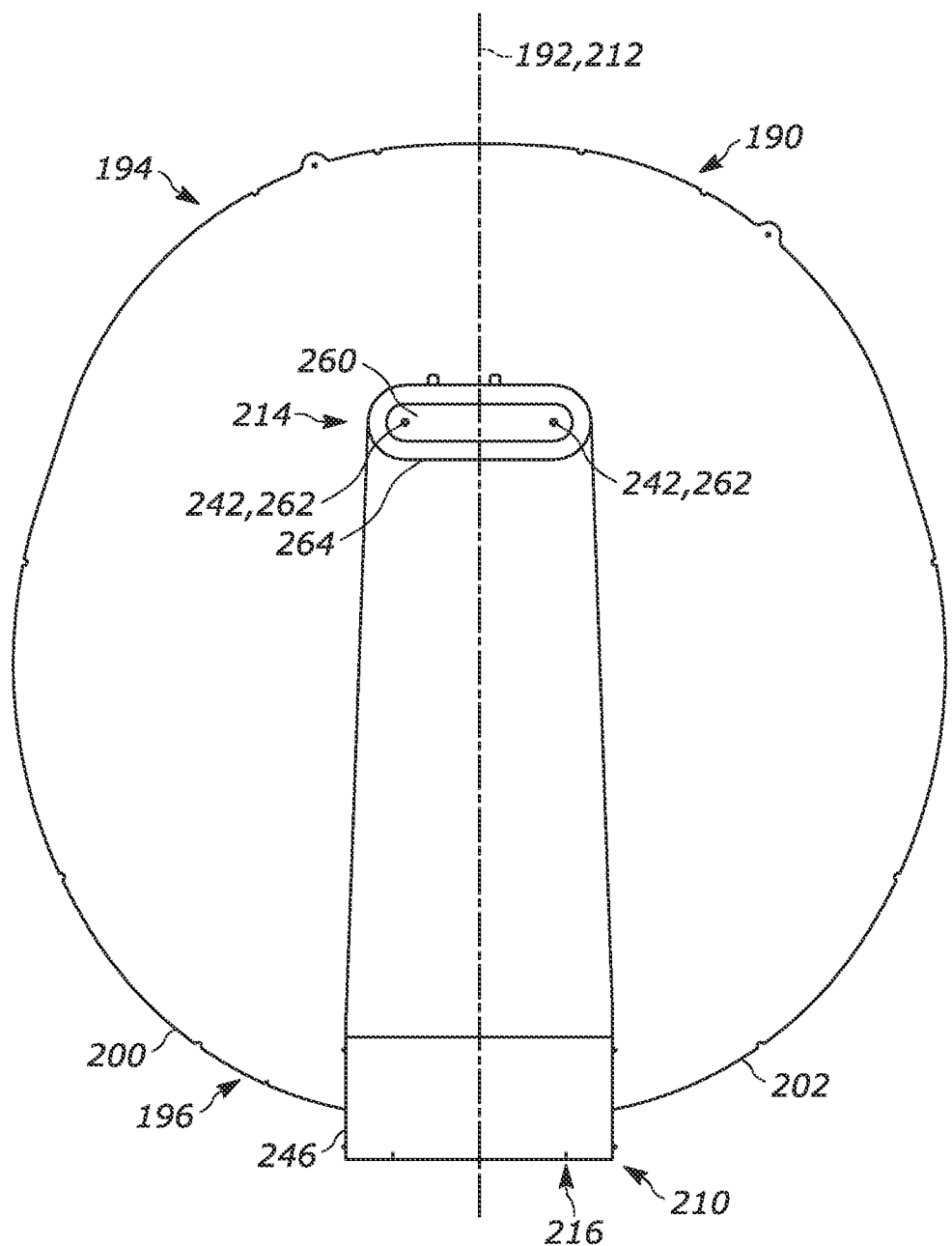
FIG. 7 is a top view of the folded-over fifth panel secured to the fourth panel.

In FIG. 7, the folded panel 210 is overlaid on the fifth panel 190 with the centerlines 192, 212 aligned. Alignment features (not shown) can be provided on the fifth panel 190 and panel 210 to facilitate longitudinally positioning the same along the centerlines 192, 212. In any case, the folded portion 246 of the panel 210 extends beyond the second end 196 of the fifth panel 190.

A reinforcing panel 260 is positioned between the first end 214 of the panel 210 and the fifth panel 190 such that alignment openings 262 in the reinforcing panel are aligned with the alignment openings 242 in the panel. Stitching 264 extends through and interconnects the fifth panel 190, panel 210, and reinforcing panel 220. As shown, the stitching 262 extends around the aligned openings 242, 262.

Figure 8A:
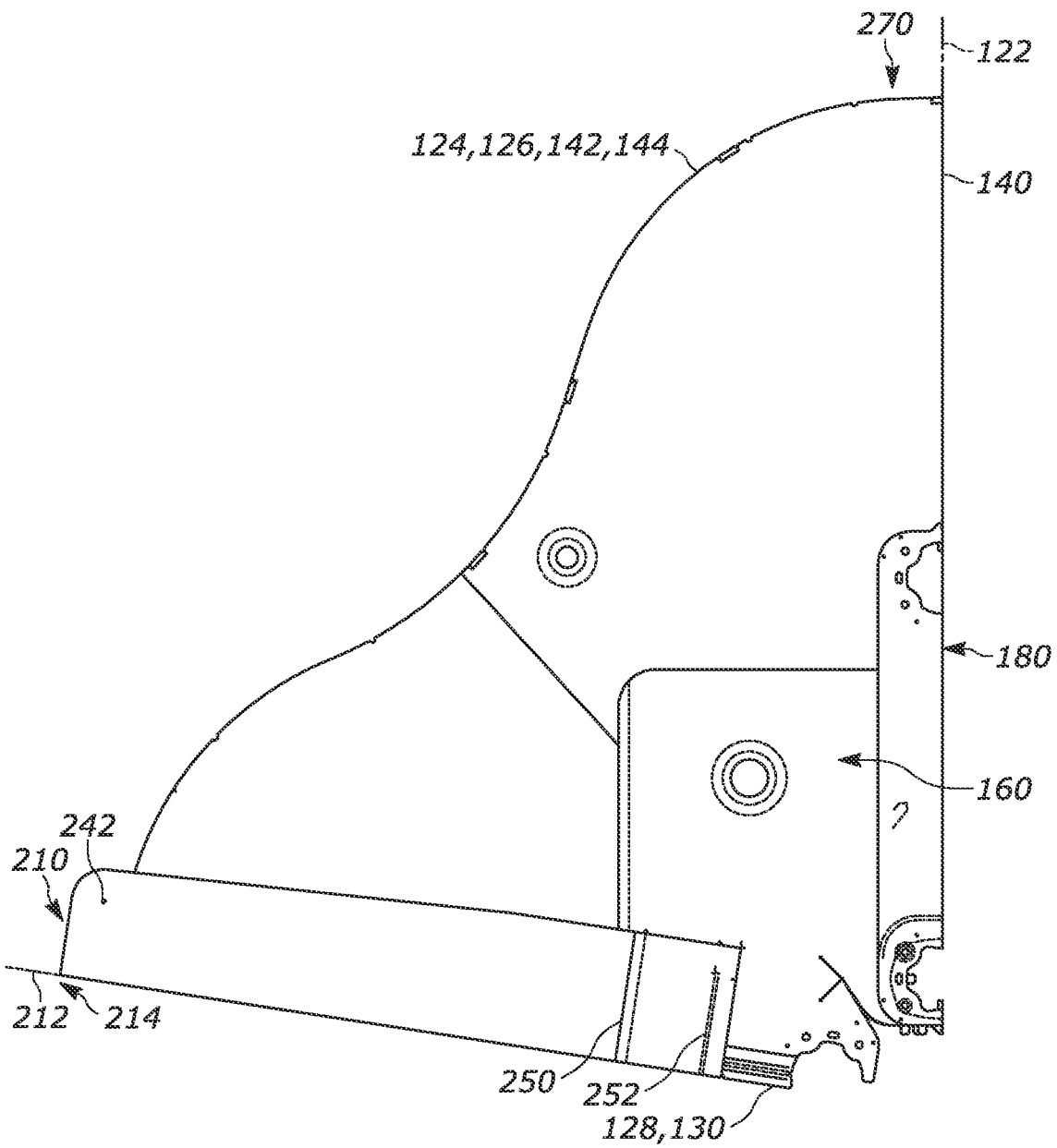
FIG. 8A is a top view of the tether attached to the assembled panels of FIG. 3.
Figure 8B:
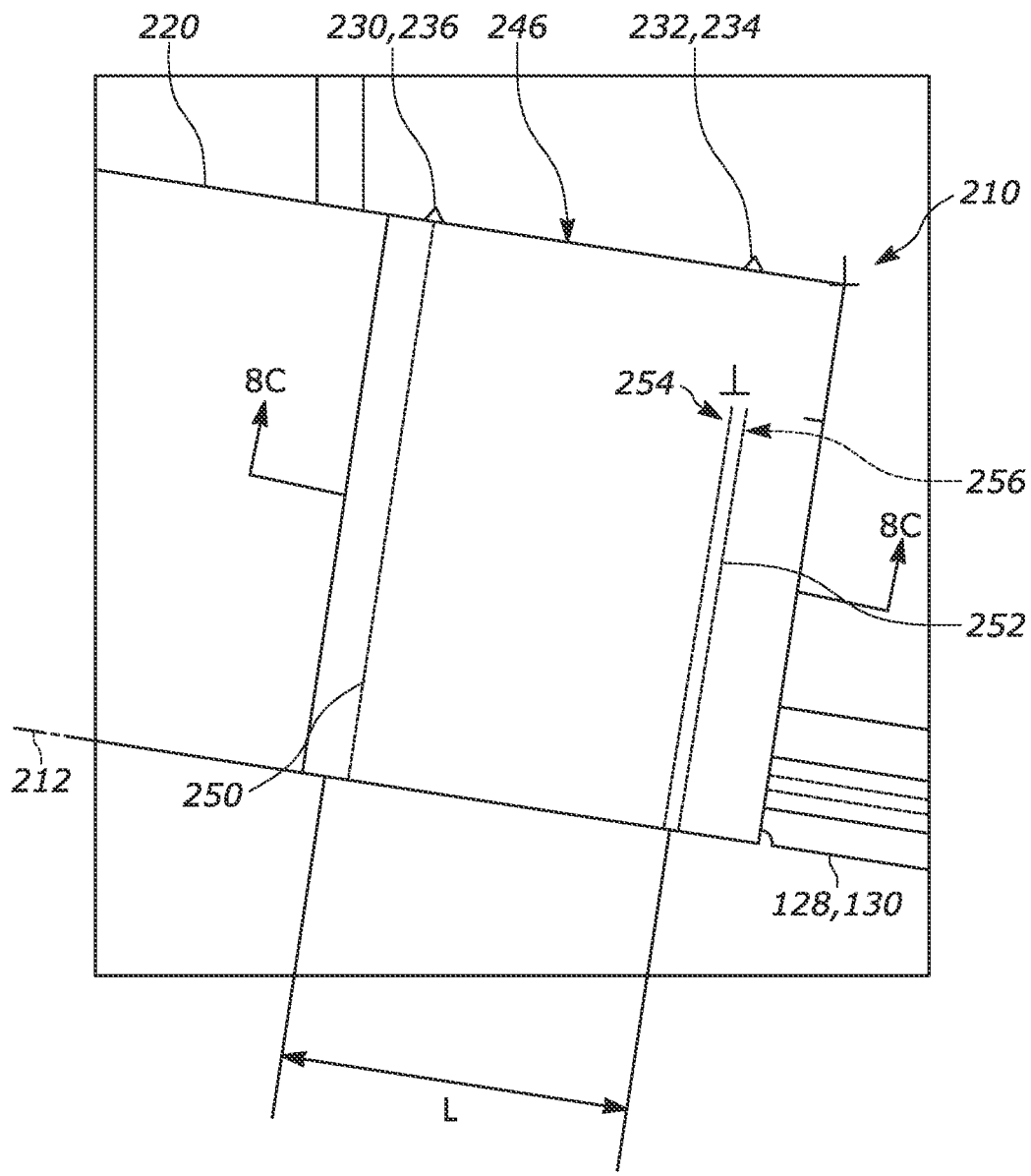
FIG. 8B is a top view of the tether attached to a subassembly of the panels.
Figure 8C:
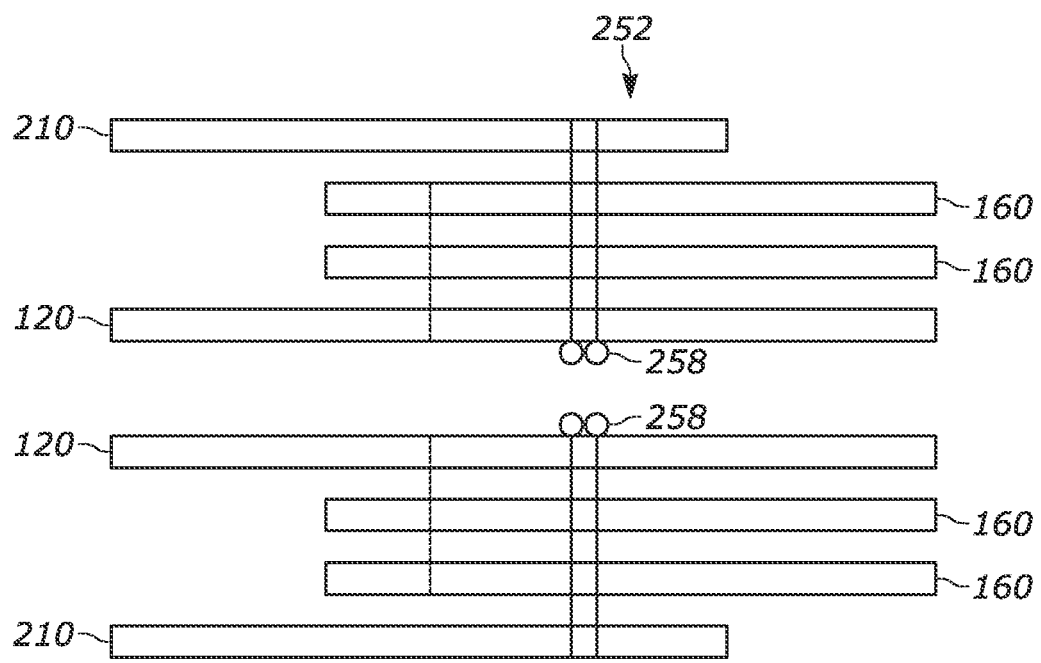
FIG. 8C is a section view of FIG. 8B taken along line 8B-8B.

Turning to FIGS. 8A-8C, the overlaid, stitched together panels 120, 140, 160, 180 of FIG. 1 are folded about the center 122 and the edge portions 128, 130 sewn together to form a subassembly 270. The folded panel 210 is again folded—this time about its centerline 212—and positioned on opposite sides of the subassembly 270. More specifically, the centerline 212 is positioned along the sewn together edge portions 128, 130 and the halves of the fifth panel 210 are moved/folded to opposite sides of the subassembly 270. The first end 214 of the fifth panel 210 is positioned to extend beyond the aligned edge portions 124, 126, 142, 144 of the panels 120, 140.

Stitching 252 extends through the folded-over portion 246, the first panel 120, and the third panels 160. It should be noted that the stitching 252 does not extend continuously through every layer of the subassembly 270. Rather, and referring further to FIG. 8C, the stitching 252 is generally u-shaped in that it extends around and to both sides of the overlaid/interconnect edge portions 128, 130. To this end, the stitching 252 extends from a first end 254 passing through one half of the tether 210, one half of each third panel 160, and one half of the first panel 120. The stitching 252 extends through these layers, passes through/around the centerline 212 and interconnected edge portions 128, 130, and the passes through the other half of the tether 210, the other half of each third panel 160, and the other half of the first panel 120, terminating at a second end 256.

The stitching 252 extends parallel to the stitching 250 and is positioned a predetermined length L from the stitching 250, closer to the longitudinal extent of the second end 216. In one example, the length L can be on the order of about 100 mm. It will be appreciated that the stitching 252 can be substantially longitudinally aligned with the overlaid tabs 232, 234. In other words, the first and second ends 254, 256 can be spaced a predetermined distance inwardly from the respective edge portions 220, 222 of the panel 210. The stitching 252 can include backtack 258 (FIG. 8C) at each respective end 254, 256 thereof and on opposite sides of the interconnected panels 120, 160, 210 to prevent loosening of the stitching.

Stitching (not shown) interconnects the edge portions 200, 202 of the fourth panel 190 with the overlaid edge portions 124, 126, 142, 144 of the panels 120, 140 in a fluid-tight manner so as to define the inflatable volume 90. In this configuration, the fourth panel 190 also defines the occupant-facing panel 92.

Returning to FIGS. 2A-2B, when a vehicle crash is detected, the controller 80 actuates the inflator 74 to inflate and deploy the airbag 70 in a known manner. Since the second end 106 of the tether 100 is secured to the occupant-facing panel 92, the second end moves in the rearward direction of the vehicle 20 with the occupant-facing panel 92 relative to the fixed first end 104.

The deploying airbag 70 tensions the tether in the manner generally indicated at T in FIG. 2A until the airbag becomes fully deployed, in which case the tether is taught. Due to the geometry of the airbag 70, the instrument panel 42, and/or the positioning of the housing 69 therein, a portion of the airbag can engage the instrument panel and/or housing along an interface identified generally at 280 in FIG. 2B. That said, tension T on the tether 100, coupled with engagement between the airbag 70 and instrument panel 42/housing 69, can produce undue stress in the tether.

With this in mind, the tether 100 is advantageously configured to mitigate the aforementioned stresses and help increase the performance and reliability of the tether. In particular, forming the folded-over portion 246 via the stitchings 250, 252 reinforces the tether 100 and helps to prevent tearing thereof during airbag deployment. To this end, both lines of stitching 250, 252 extend transverse to the centerline 212. Due to the orientation of the tether 100 within the airbag 70, this results in the stitchings 250, 252 extending transverse, e.g., perpendicular, to the direction of tension T on the tether (see FIG. 6A). This helps to maximize the resistance of the stitchings 250, 252 to tearing/coming undone when tensioned.

Furthermore, the stitchings 250, 252 are specifically positioned along the length of the tether 100 such that the segment of the folded-over portion 246 along the length L is configured to align with the interface 280 between the airbag 70 and the instrument panel 42 and/or housing 69. In other words, the length L and longitudinal positioning of the stitchings 250, 252 is tailored to provide the most robust portion of the tether 200 at the location where deployment forces are highest—at the interface.

Additionally, the tapered shape of the panel, as well as the spacing the ends of the stitching from the longitudinal edge portions, helps to helps to better distribute tensile forces acting on the tether. In particular, these features help the tether to experience reduced stitch force, reduced edge tearing force, and a more evenly spread force distribution across the panel fabric during deployment of the airbag. This advantageously helps to prevent tearing of the tether and/or stitchings during airbag deployment.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An apparatus for helping to protect an occupant of a seat in a vehicle having an instrument panel and a housing positioned therein, comprising:
    an airbag for positioning in the housing and defining an inflatable volume for receiving inflation fluid from an inflator, the airbag including an occupant-facing panel;
    a tether having a first end connected to the occupant-facing panel for forming a pocket therein and a second end connected to a portion of the airbag positioned within the housing, the second end including a folded-over portion;
    first stitching extending through the folded-over portion in a direction extending transverse to a centerline of the tether; and
    second stitching extending through the folded-over portion and parallel to the first stitching, the first and second stitchings being spaced a predetermined length from one another.

2. The apparatus recited in claim 1, wherein the first stitching extends perpendicular to the centerline.

3. The apparatus recited in claim 1, wherein the predetermined length is configured such that the tether engages at least one of the housing and the instrument panel between the first and second stitchings.

4. The apparatus recited in claim 1, wherein the tether has a width that increases in a direction extending from the first end to the second end.

5. The apparatus recited in claim 4, wherein the width increases continuously from the first end to the second end.

6. The apparatus recited in claim 1, wherein the second stitching is positioned closer to an axial extent of the folded-over portion at the second end.

7. The apparatus recited in claim 6, wherein the second stitching includes backtacked first and second ends.

8. The apparatus recited in claim 1, wherein the tether is folded over a second centerline extending perpendicular to the centerline to form the folded over portion.

9. An apparatus for helping to protect an occupant of a seat in a vehicle having an instrument panel and a housing positioned therein, comprising:
    an airbag for positioning in the housing and defining an inflatable volume for receiving inflation fluid from an inflator, the airbag including an occupant-facing panel;
    a tether extending along a centerline from a first end connected to the occupant-facing panel for forming a pocket therein to a second end connected to a portion of the airbag positioned within the housing, the second end including a folded-over portion, the tether having a width that increases continuously from the first end to the second end;
    first stitching extending through the folded-over portion in a direction extending perpendicular to the centerline; and
    second stitching extending through the folded-over portion and parallel to the first stitching, the first and second stitchings being spaced a predetermined length from one another.

10. The apparatus recited in claim 9, wherein the predetermined length is configured such that the tether engages at least one of the housing and the instrument panel between the first and second stitchings.

11. The apparatus recited in claim 9, wherein the second stitching is positioned closer to an axial extent of the folded-over portion at the second end.

12. The apparatus recited in claim 11, wherein the second stitching includes backtacked first and second ends.

13. The apparatus recited in claim 9, wherein the tether is tensioned during airbag deployment in a direction extending along the centerline such that the first and second stitchings extend perpendicular to the tether tension direction.

14. The apparatus recited in claim 9, wherein the tether is folded over a second centerline extending perpendicular to the centerline to form the folded over portion.

\* \* \* \* \*